July 7, 1964
W. R. SPENCER ETAL
3,140,475
ELECTROMAGNETIC POSITION TRANSLATING DEVICE
Filed Dec. 30, 1960
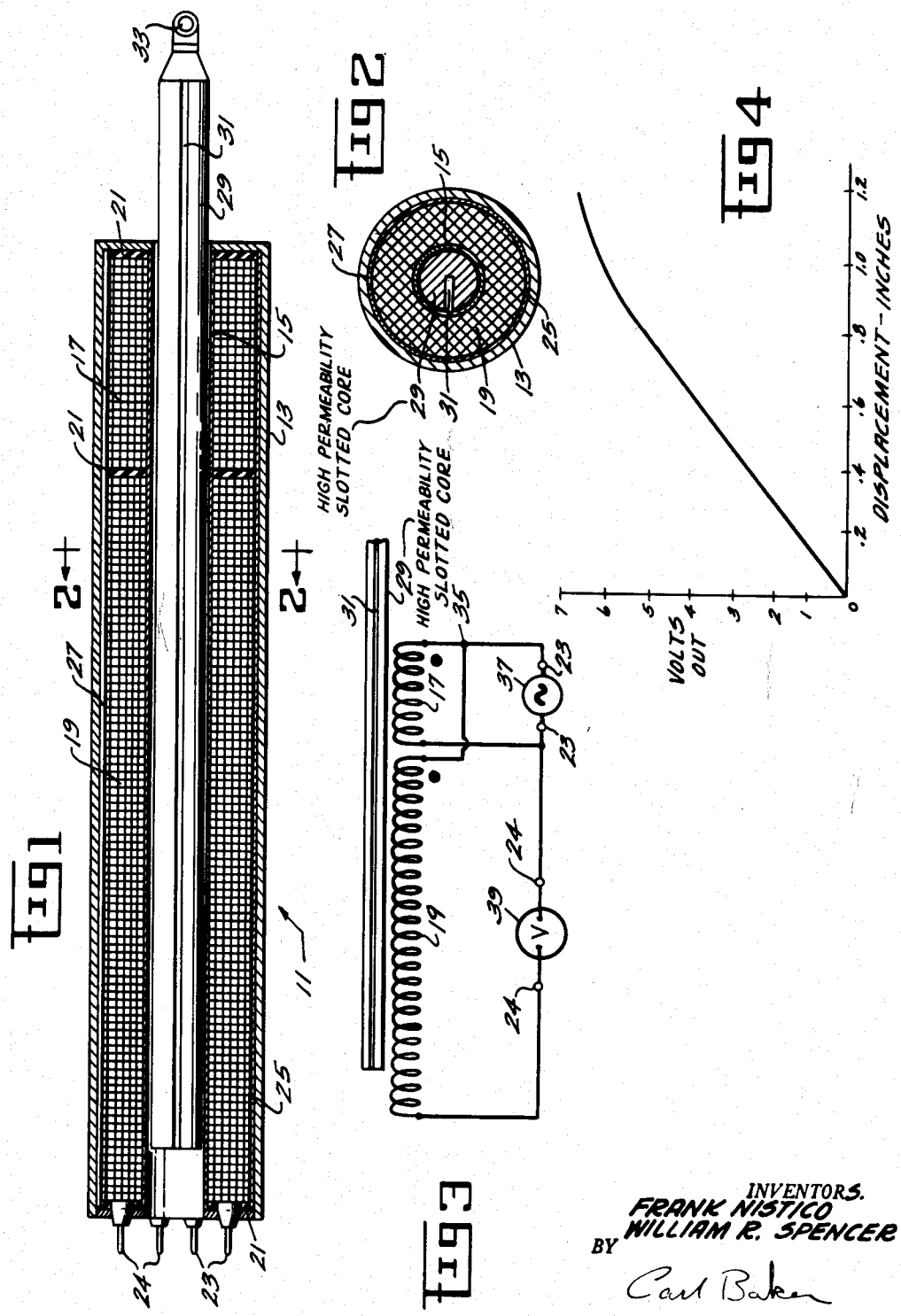
INVENTORS.
FRANK NISTICO
WILLIAM R. SPENCER
BY
*Carl Baker*
ATTORNEY—

United States Patent Office 3,140,475
Patented July 7, 1964

3,140,475
ELECTROMAGNETIC POSITION TRANSLATING DEVICE
William R. Spencer, Springdale, Ohio, and Frank Nistico, Malvern, Pa., assignors to General Electric Company, a corporation of New York
Filed Dec. 30, 1960, Ser. No. 79,598
2 Claims. (Cl. 340—196)

This invention relates to electrical position translating devices and more specifically to such devices of electromagnetic type providing electrical signal output in response to a position or motion input.

Electromagnetic devices for position and motion indication have found use in many different applications and take many different constructional forms. Typically, however, these devices comprise a plurality of magnetically coupled windings and a magnetic core member movable relative to the windings to variably control the coupling therebetween, to thus vary the voltage induced in the secondary windings by an A.C. voltage applied across the primary windings.

The present invention is directed to electromagnetic translating devices of this general category and has as its principal objective the provision of new and improved apparatus of this type. More particularly the invention provides electromagnetic translating devices of substantially reduced length and weight requirement as compared against prior art devices of like purpose, this being accomplished through elimination of one or more of the several windings normally required in the prior art devices without attendant complication of construction of the translating device or of the power supply and read-out apparatus associated with it.

It is accordingly an object of this invention to provide electromagnetic translating devices characterized by comparatively small size and low weight for units of given range of position measurement, and further characterized by reduced complexity thus affording good economy of manufacture and use.

In carrying out the invention in its preferred embodiment, there is provided a primary coil and secondary coil coaxially aligned in end-to-end relation and electrically connected in series, with an A.C. supply connected across the primary coil and a signal readout device connected across both the primary and secondary coils in series relation. The primary and secondary coils are connected in opposition so that the voltage induced in the secondary coil bucks that imposed across the primary, and the read-out device senses the difference of these opposed voltages. A magnetic core member is movable within the coils to vary the magnetic coupling between them and thus vary the voltage induced in the secondary. The resultant change in the difference between this induced voltage and the supply voltage provides an accurate and substantially linear measure of core position.

The invention will itself be further understood and its various objects, features and advantages more fully appreciated by reference to the appended claims and the following detailed description when read in conjunction with the accompanying drawing, wherein:

FIGURE 1 is a part sectional view of an electromagnetic translating device in accordance with the invention;

FIGURE 2 is a sectional view taken along the lines of 2—2 in FIGURE 1;

FIGURE 3 is an electrical circuit diagram illustrating the electrical wiring of the apparatus of FIGURE 1 and associated power supply and read-out apparatus; and FIGURE 4 is a curve representative of performance of the translating device of FIGURE 1.

With continued reference to the drawings, wherein like reference numerals have been used throughout to designate like elements, an electromagnetic translating device in accordance with the invention is designated generally by reference numeral 11 in FIGURE 1. As shown, this translating device comprises an outer casing in the form of an elongated tubular member 13. Disposed concentrically within this tubular member 13, in radially spaced relationship therewith, is a second tubular member 15 fabricated of a non-magnetic material such as one of the phenolic plastics, for example.

Within the annular space enclosed between the inner and outer tubular members 13 and 15, respectively, there is disposed a primary coil 17 and a secondary coil 19 with the two coils being coaxially aligned in end-to-end relationship as shown. Both these coils preferably are layer wound in either single or multiple layer fashion, and both may be either uniform or non-uniform wound to obtain desired linear or non-linear output characteristics as hereinafter explained.

Spacer discs 21 may be provided to electrically isolate the two coils from each other and from the ends of the outer casing. The coils are provided with input terminal connections as shown at 23 for A.C. power supply to the primary coil and output terminal connections as at 24 for signal output. Preferably, a tubular shield 25 fabricated of a magnetic material such as one of the ferrous metals and longitudinally slotted as shown at 27 in FIGURE 2 is provided to confine the magnetic field within the device to thus enhance its gain characteristics and to minimize interference by any external magnetic field.

Within the inner casing member 15 there is longitudinally movable a core element 29 fabricated of a high-permeability magnetic material, this core element preferably being longitudinally slotted as shown at 31 to reduce eddy current losses within the core. Core element 29 is made at least slightly longer than the overall length of the two coils 17 and 19 so as to have one end projecting from the casing 13, and at its projecting end is provided with any suitable connection fitting such as shown at 33 for mechanical connection to the input device the longitudinal position or movement of which is to be sensed.

With reference now to FIGURE 3, the primary and secondary coils 17 and 19, respectively, are shown provided with a common connection at 35. Between the terminals 23, which connect directly to the primary coil 17 as shown, there may be connected an A.C. power supply source 37 of suitable voltage and frequency; say, for example, about 24 volts and 400 cycles which are power supply characteristics commonly found in aircraft accessory applications. Between the two output terminals 24 any suitable voltage-sensitive indicating or recording device may be connected to perform the desired signal read-out or control function. For simplicity, an A.C. voltmeter 39 is shown utilized for this purpose.

The output terminals 24 are connected one to one end of the secondary coil 19 and one to the end of the primary coil 17 remote from the common connection which that coil has with the secondary coil at 35. In other words, the output terminals connect across the primary and secondary coils in series relation. As previously noted, the primary and secondary coils 17 and 19 are wound in such relation to each other that the voltage induced in the secondary coil bucks that imposed across the primary by the A.C. supply source 37.

The magnetic core element magnetically couples the primary and secondary coils to a degree dependent upon the longitudinal position of the core element within the secondary coil, so that when the core is in the fully inserted position, i.e., fully to the left in FIGURE 1, maximum coupling between the two coils is afforded. The net voltage output, which is the voltage difference between the supply voltage imposed on the primary and the induced voltage across the secondary, then is a minimum. Generally it is desirable that under these conditions the supply and induced voltages are precisely equal to thus afford a null, which may be obtained by proper selection of turns ratio between the two coils.

With such arrangement, the net voltage output, which is the difference between the supply voltages to the primary and the induced voltage across the secondary, will bear substantially direct relationship to linear position of the magnetic core element 29, in accordance with the relation:

$$\frac{E_{out}}{E_{in}} = \frac{Kn_s x}{N_p}$$

where $E_{out}$ is the voltage output as indicated by voltmeter 39, $E_{in}$ is the supply voltage, K is a magnetic coupling coefficient the precise value of which will depend upon design parameters chosen and typically is of the order of 0.5, $N_p$ is the total number of turns in the primary coil, $n_s$ is the number of turns per inch in the secondary coil, and $x$ is the displacement of the core element in inches from its null position.

FIGURE 4 illustrates this relationship in the form of a curve of voltage output against core element displacement in inches, the curve shown being representative of a practical instrument constructed in accordance with the invention. As shown, the relationship between voltage output and core displacement is quite linear except at the extreme of core element travel where the core is almost completely withdrawn from the secondary coil, at which point end effects may introduce some non-linearity into the output signal. Usually it is preferable simply to dimension the translating device so as to avoid the necessity to operate within this narrow range of possible non-linearity, though if preferred any non-linearity in output may be compensated for by introducing complementary non-linearity in the signal read-out device or by non-linear winding of one or both of the primary and secondary coils.

It will be noted that since the translating device of this invention incorporates but a single primary coil and a single secondary coil, the necessity for balanced primary or secondary coils required in prior art devices is obviated by the invention and a very substantial reduction in required length and weight of the translating device thus achieved. At the same time, the reduction in number of coils permits greater economy of manufacture without sacrifice of accuracy, sensitivity or reliability, and without complication of the associated power supply and read-out apparatus.

While only one embodiment of the invention has been described and illustrated by way of example in the foregoing, many modifications will occur to those skilled in the art and it therefore should be understood that the appended claims are intended to cover all such modifications as fall within the true spirit and scope of the invention.

What is claimed as new and desire to be secured by Letters Patent of the United States is:

1. Electromagnetic position translating means comprising a primary coil and a secondary coil coaxially aligned in end-to-end relation and having a common connection at one end of each thereof, an A.C. voltage source connected between said common connection and the end of said primary coil remote therefrom, A.C. voltage sensitive means connected between the ends of said primary and secondary coils remote from said common connection, and a magnetically permeable core element of substantially greater length than said primary coil extending through that coil and at least partially through said secondary coil and movable relative to said coils by an input device the position of which is to be sensed, said primary and secondary coils being wound in such relation to each other that the voltage imposed across the primary coil by said A.C. source opposes that induced in the secondary coil and said A.C. voltage sensitive means accordingly is responsive to the difference of these voltages.

2. Electromagnetic position translating means comprising a primary coil and a secondary coil coaxially aligned in end-to-end relation and having a common connection at one end of each thereof, an A.C. voltage source connected between said common connection and the end of said primary coil remote therefrom, A.C. voltage sensitive means connected between the ends of said primary and secondary coils remote from said common connection, and a core element of magnetically permeable material disposed within said primary and secondary coils and of length at least equal to the combined length of said coils, said core element being movable to at least partially withdraw it from within said secondary coil by an input device the position of which is to be sensed, said primary and secondary coils being wound in such relation to each other that the voltage imposed across the primary coil by said A.C. source opposes that induced in the secondary coil and wound with a turns ratio such that when said core element is fully inserted within said secondary coil the opposed voltages are equal and said A.C. voltage sensitive means accordingly senses a null.

References Cited in the file of this patent
UNITED STATES PATENTS

| | | |
|---|---|---|
| 386,956 | Belfield | July 31, 1888 |
| 2,095,420 | Polydoroff | Oct. 12, 1937 |
| 2,196,809 | Hoadley | Apr. 9, 1940 |
| 2,430,757 | Conrad | Nov. 11, 1947 |